(12) United States Patent
Bouchard et al.

(10) Patent No.: US 12,474,912 B2
(45) Date of Patent: Nov. 18, 2025

(54) SYSTEMS AND METHODS FOR IDENTIFYING AND VERIFYING SOFTWARE COMPONENT STORAGE LOCATIONS IN A NETWORK ENVIRONMENT

(71) Applicant: BANK OF AMERICA CORPORATION, Charlotte, NC (US)

(72) Inventors: Pierre Jacques Bouchard, Davidson, NC (US); Lakshminarayana Vishnubhotla, Skillman, NJ (US); John L. Reilly, Charlotte, NC (US); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 49 days.

(21) Appl. No.: 17/887,123

(22) Filed: Aug. 12, 2022

(65) Prior Publication Data

US 2024/0053975 A1    Feb. 15, 2024

(51) Int. Cl.
*G06F 8/65* (2018.01)
*G06F 16/23* (2019.01)

(52) U.S. Cl.
CPC ............ *G06F 8/65* (2013.01); *G06F 16/2379* (2019.01)

(58) Field of Classification Search
CPC ................. G06F 8/61; G06F 8/65; G06F 8/70
See application file for complete search history.

(56) References Cited

U.S. PATENT DOCUMENTS

| | | |
|---|---|---|
| 5,283,904 A | 2/1994 | Carson et al. |
| 5,894,577 A | 4/1999 | MacDonald et al. |
| 6,202,207 B1 | 3/2001 | Donohue |
| 6,314,565 B1 | 11/2001 | Kenner et al. |
| 7,461,374 B1 | 12/2008 | Balint et al. |
| 8,141,065 B2 | 3/2012 | Shamilian et al. |
| 8,201,161 B2 | 6/2012 | Challener et al. |
| 9,250,826 B2 | 2/2016 | Fromm |
| 10,635,423 B2 | 4/2020 | Newell et al. |
| 11,057,237 B2 | 7/2021 | Ansari et al. |
| 11,204,756 B1 * | 12/2021 | Samuel ..................... G06F 8/65 |

(Continued)

FOREIGN PATENT DOCUMENTS

CN    106020854    10/2016

*Primary Examiner* — Duy Khuong T Nguyen
(74) *Attorney, Agent, or Firm* — Moore & Van Allen PLLC; Lauren M. Stokes

(57) ABSTRACT

Systems, computer program products, and methods are described herein for systems and methods for identifying and verifying software component storage locations in a network environment. The present invention is configured to identify and verify software locations in a network environment by generating a network resource component tracking database associated with a network environment, the network resource component tracking database comprising a plurality of location indicators associated with a component; generating a plurality of location requests based on the plurality of location indicators; transmitting the plurality of location requests to a plurality of locations associated with the plurality of location indicators; receiving a plurality of location responses based on the plurality of location requests; and updating the network resource component tracking database based on the plurality of location responses.

19 Claims, 7 Drawing Sheets

(56) References Cited

U.S. PATENT DOCUMENTS

| | | |
|---|---|---|
| 11,228,617 B2 | 1/2022 | Raleigh |
| 11,522,788 B2 | 12/2022 | Davie et al. |
| 12,086,157 B2 * | 9/2024 | Grimaldi ............... G06F 16/273 |
| 2002/0133814 A1 | 9/2002 | Bourke-Dunphy et al. |
| 2005/0097543 A1 * | 5/2005 | Hirayama ................. G06F 8/65 |
| | | 717/173 |
| 2005/0132350 A1 | 6/2005 | Markley et al. |
| 2008/0154805 A1 * | 6/2008 | Gurumoorthy ......... G06F 9/505 |
| | | 717/174 |
| 2009/0183145 A1 | 7/2009 | Hu et al. |
| 2010/0058320 A1 | 3/2010 | Milligan et al. |
| 2010/0146087 A1 | 6/2010 | Kumar et al. |
| 2011/0265080 A1 | 10/2011 | Matthew et al. |
| 2014/0280663 A1 | 9/2014 | Sivanich et al. |
| 2016/0034269 A1 * | 2/2016 | Furuichi ................. H04L 67/34 |
| | | 717/169 |
| 2016/0171245 A1 * | 6/2016 | Bura ......................... G06F 8/71 |
| | | 726/17 |

\* cited by examiner

SYSTEMS AND METHODS FOR IDENTIFYING AND VERIFYING SOFTWARE COMPONENT STORAGE LOCATIONS IN A NETWORK ENVIRONMENT

FIELD OF THE INVENTION

The present invention embraces a system for identifying and verifying software component storage locations in a network environment.

BACKGROUND

Computing systems and managers of computing systems in a network environment may have a difficult time tracking each individual software component, software element, and/or hardware element within the network environment. Thus, there exists a need for a dynamic tracking of these individual elements (which are herein also referred to as "components") such that a manager of the network environment can immediately track each instance/copy of the components, their individual versions, and potential updates, without undue burden. In some instances, such a tracking of these components may further be needed to determine where and when to update each component within the network environment where the components are not in current use (e.g., being executed) which, if the components are in current use, could disrupt the component at its specific location at inopportune times.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system identifying and verifying software locations in a network environment, the system comprising: a memory device with computer-readable program code stored thereon; at least one processing device operatively coupled to the at least one memory device and the at least one communication device, wherein executing the computer-readable code is configured to cause the at least one processing device to: generate a network resource component tracking database associated with a network environment, the network resource component tracking database comprising a plurality of location indicators associated with a component; generate a plurality of location requests based on the plurality of location indicators; transmit the plurality of location requests to a plurality of locations associated with the plurality of location indicators; receive a plurality of location responses based on the plurality of location requests; and update the network resource component tracking database based on the plurality of location responses.

In some embodiments, the system may further provide that the generation of the network resource component tracking database comprises the processing device being further configured to generate the plurality of location indicators associated with the component by scanning the network environment for each location of the component.

In some embodiments, the system may further provide that the generation of the network resource component tracking database comprises the processing device being further configured to generate the plurality of location indicators associated with the component by scanning a new iteration of the component as the new iteration of the component is uploaded to the network environment and determining a new location of the new iteration of the component.

In some embodiments, the system may further provide that the component comprises a version of the component, such that the plurality of location requests are transmitted to the plurality of locations associated with the version of the component.

In some embodiments, the system may further provide that the component comprises a plurality of versions of the component, such that the plurality of location requests are transmitted to the plurality of locations associated with the plurality of versions of the component.

In some embodiments, the processing device may further be configured to track the embedding of each instance of the component within the network environment, the embedding of each instance of the component comprising a plurality of hardware components having an instance of the component embedded thereon; and update the network resource component tracking database with a plurality of hardware component identifiers associated with the plurality of hardware components having the instance of the component.

In some embodiments, the processing device may further be configured to track the embedding of each instance of the component within the network environment, the embedding of each instance of the component comprising a plurality of software files comprising an instance of the component embedded therein; and update the network resource component tracking database with a plurality of file indicators associated with the plurality of software files comprising the instance of the component.

In some embodiments, the system may provide that the network resource component tracking database comprises a map of each instance of the component within a plurality of locations, the plurality of locations comprising location indicators and a plurality of nodes between each location indicator.

In some embodiments, the processing device may further be configured to dynamically update the network resource component tracking database based on the plurality of location responses, wherein, in an instance where a location response comprises an indication that the component is not in a location associated with a location indicator of the plurality of location indicators, delete the location indictor associated with the component in the network resource component tracking database, or wherein, in an instance where the location response comprises an indication that the component is in the location associated with the location indicator, save the location indicator associated with the component in the network resource component tracking database.

In some embodiments, the processing device may further be configured to receive an update indication for the component; and automatically update each instance of the component at each location associated with the component identified by the network resource component tracking database. In some embodiments, the system may provide that where an update indication is received, the processing device is further configured to: track a use of each instance of the component at each location associated with the component to determine a period of non-use of each instance of the component; and automatically update at a period of non-use for each instance of the component. In some embodiments, the system may provide that where the processing device is further configured to generate an update queue comprising each instance of the component at each location associated with the component, wherein the update queue is based on a queue of the period of non-use for each instance of the component.

In another aspect, a computer program product for identifying and verifying software locations in a network environment is provided. The computer program product may comprise at least one non-transitory computer-readable medium having computer-readable program code portions embodied therein, the computer-readable program code portions which when executed by a processing device are configured to cause the processor to: generate a network resource component tracking database associated with a network environment, the network resource component tracking database comprising a plurality of location indicators associated with a component; generate a plurality of location requests based on the plurality of location indicators; transmit the plurality of location requests to a plurality of locations associated with the plurality of location indicators; receive a plurality of location responses based on the plurality of location requests; and update the network resource component tracking database based on the plurality of location responses.

In some embodiments, the computer program product may provide that the generation of the network resource component tracking database comprises the processing device being further configured to generate the plurality of location indicators associated with the component by scanning the network environment for each location of the component.

In some embodiments, the computer program product may provide that the generation of the network resource component tracking database comprises the process device being further configured to generate the plurality of location indicators associated with the component by scanning a new iteration of the component as the new iteration of the component is uploaded to the network environment and determining a new location of the new iteration of the component.

In some embodiments, the computer processing device may further be configured to track the embedding of each instance of the component within the network environment, the embedding of each instance of the component comprising a plurality of hardware components having an instance of the component embedded thereon; and update the network resource component tracking database with a plurality of hardware component identifiers associated with the plurality of hardware components having the instance of the component.

In some embodiments, the computer processing device may further be configured to track the embedding of each instance of the component within the network environment, the embedding of each instance of the component comprising a plurality of software files comprising an instance of the component embedded therein; and update the network resource component tracking database with a plurality of file indicators associated with the plurality of software files comprising the instance of the component.

In some embodiments, the processing device may further be configured to dynamically update the network resource component tracking database based on the plurality of location responses, wherein, in an instance where a location response comprises an indication that the component is not in a location associated with a location indicator of the plurality of location indicators, delete the location indictor associated with the component in the network resource component tracking database, or wherein, in an instance where a location response comprises an indication that the component is in the location associated with the location indicator, save the location indicator associated with the component in the network resource component tracking database.

In some embodiments, the processing device may further be configured to receive an update indication for the component; and automatically update each instance of the component at each location associated with the component identified by the network resource component tracking database.

In another aspect, a computer-implemented method for identifying and verifying software locations in a network environment, the computer-implemented method comprising: generating a network resource component tracking database associated with a network environment, the network resource component tracking database comprising a plurality of location indicators associated with a component; generating a plurality of location requests based on the plurality of location indicators; transmitting the plurality of location requests to a plurality of locations associated with the plurality of location indicators; receiving a plurality of location responses based on the plurality of location requests; and updating the network resource component tracking database based on the plurality of location responses.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
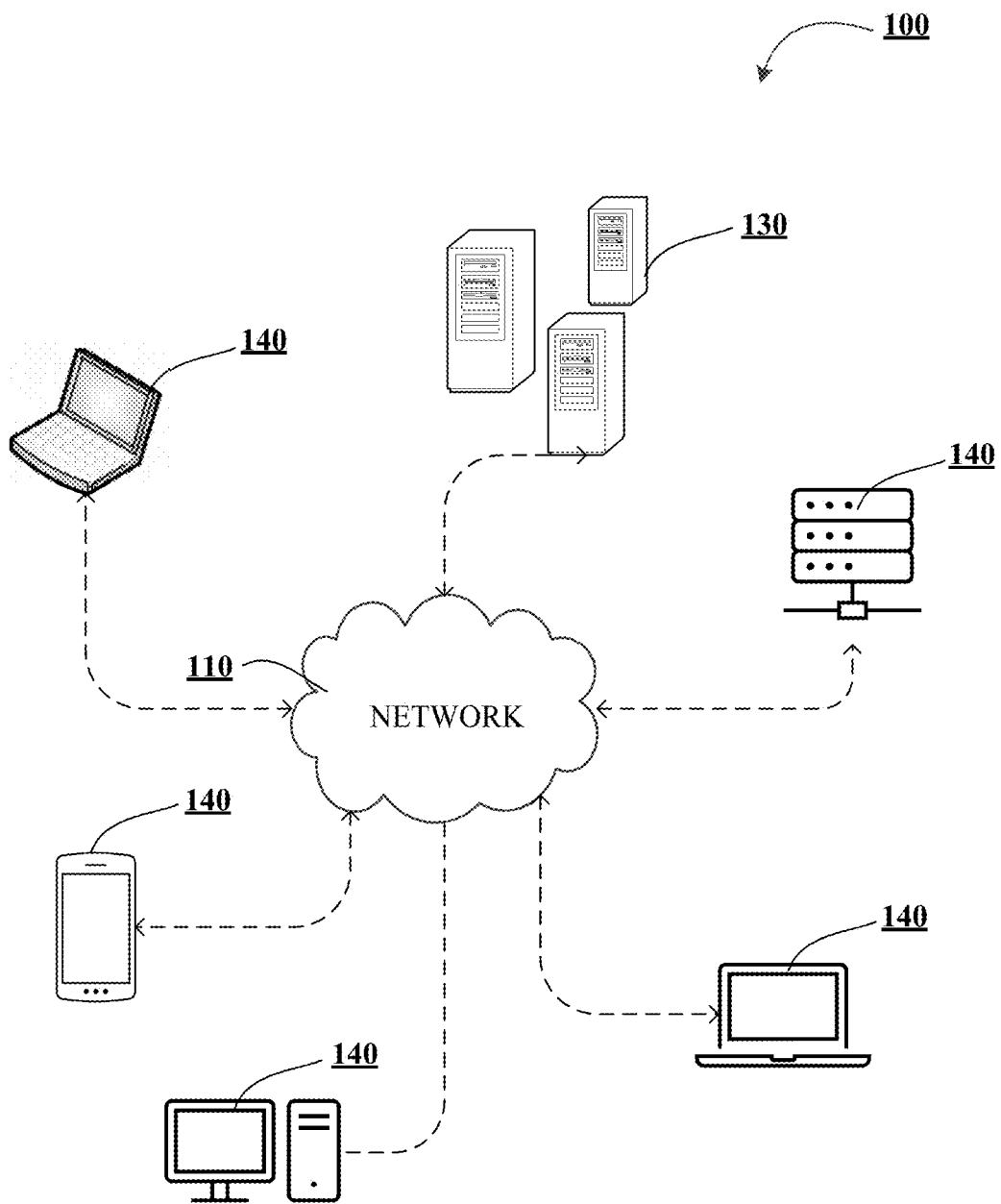
Figure 1B:
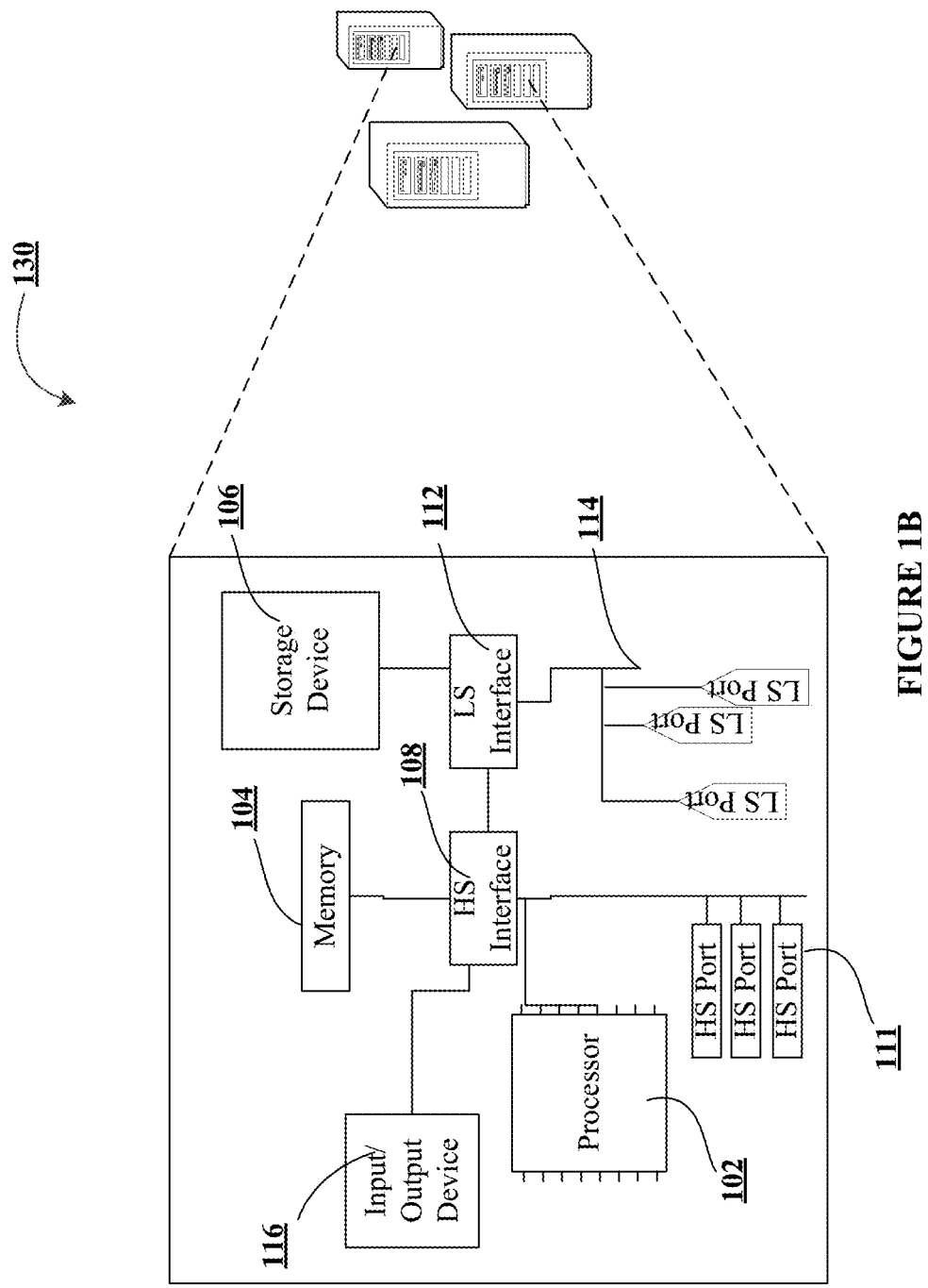
Figure 1C:
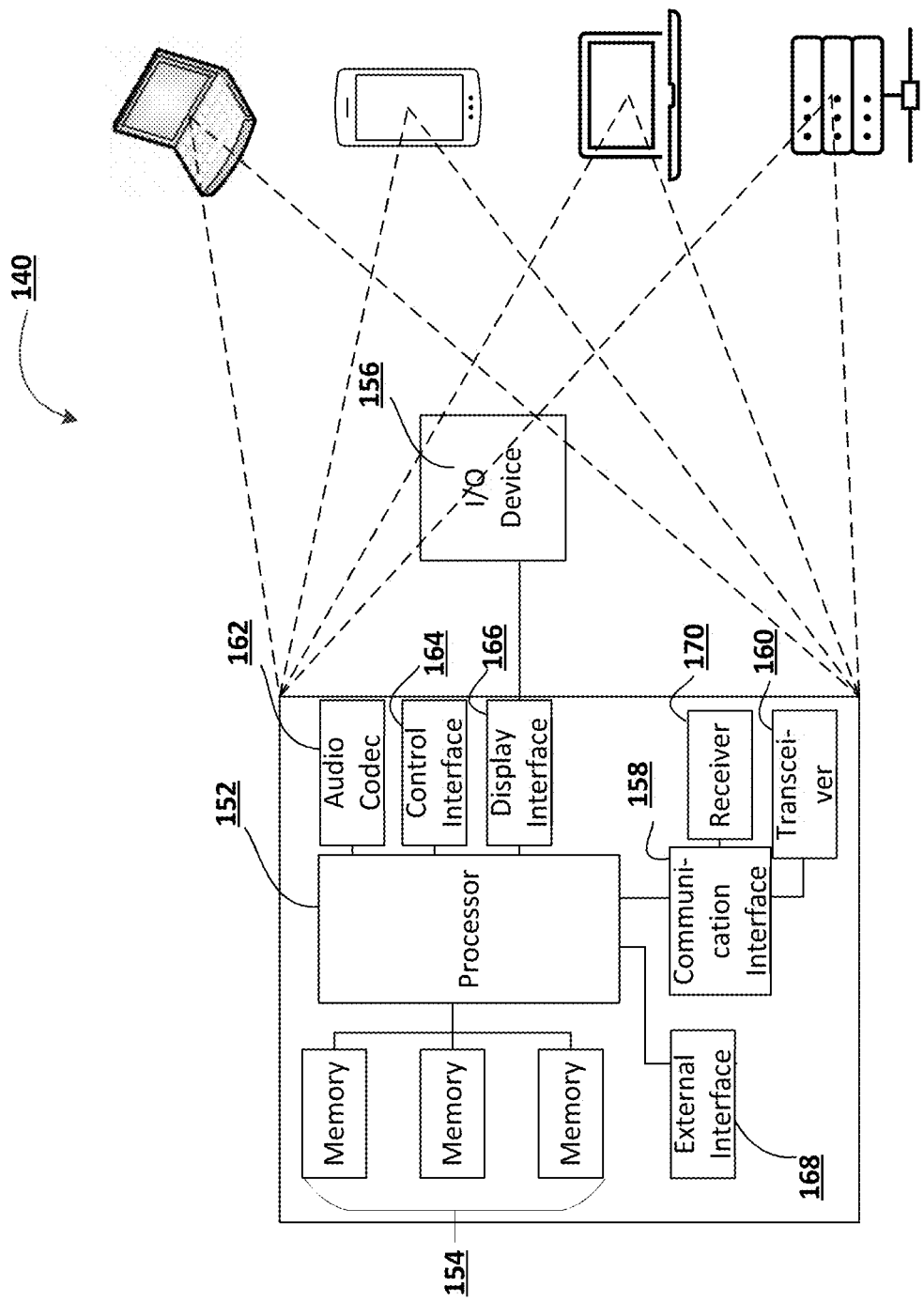
Figure 2:
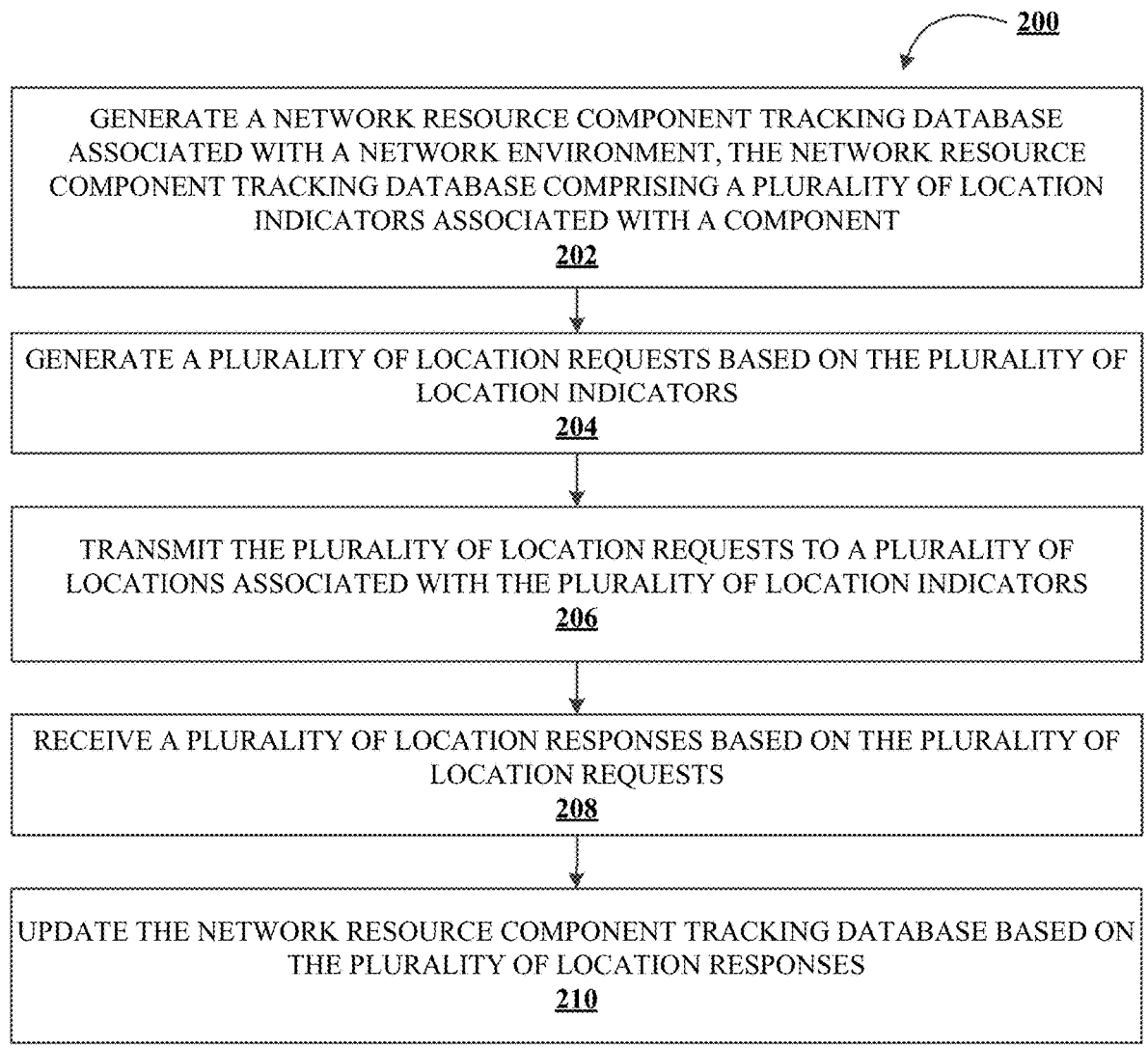
Figure 3:
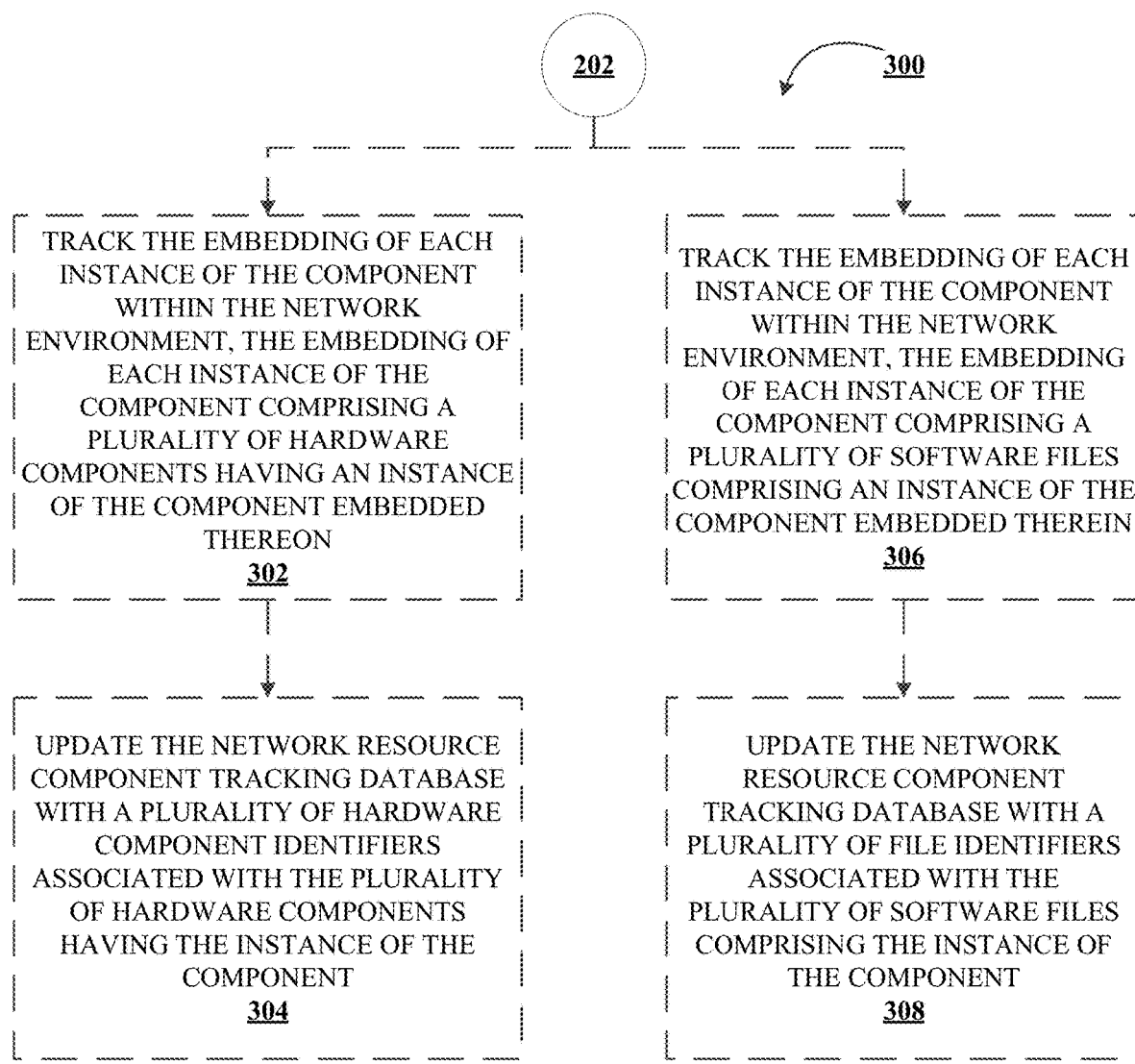
Figure 4:
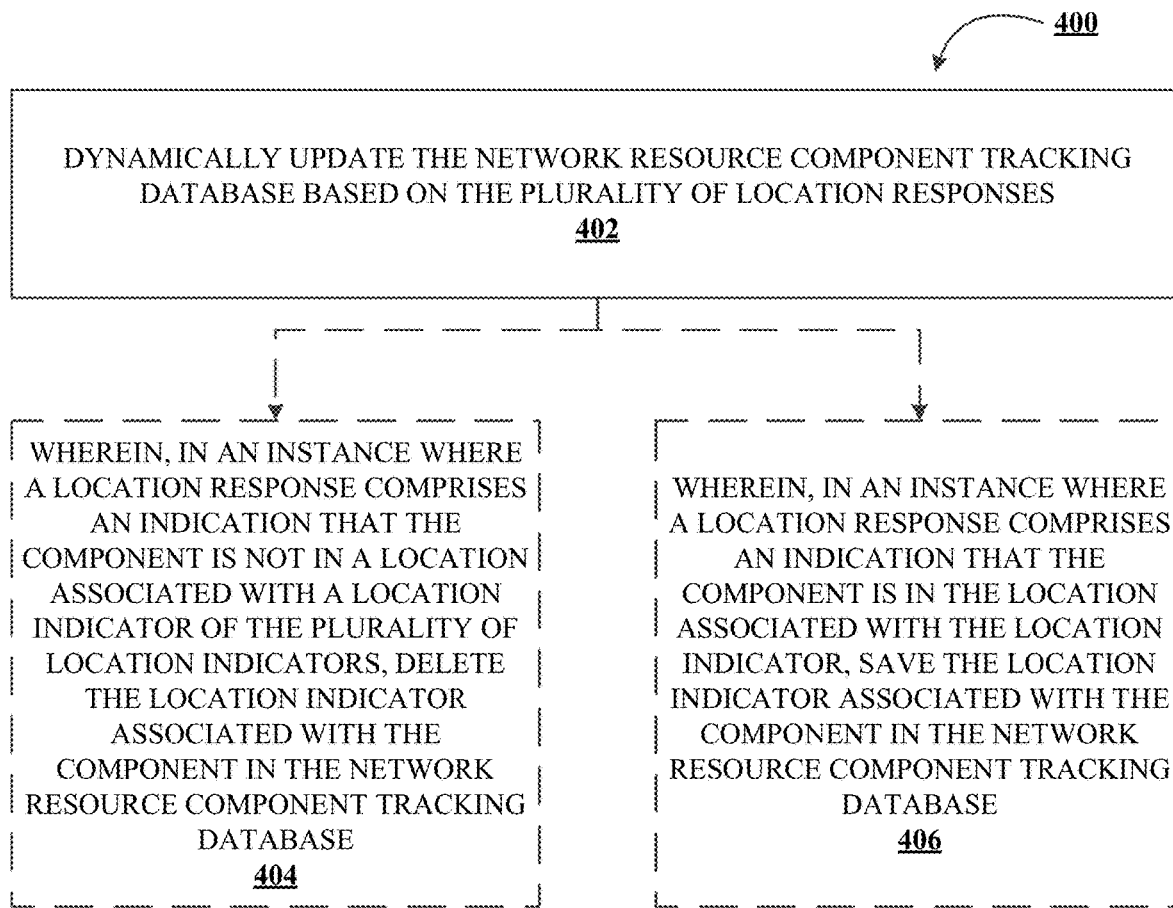
Figure 5:
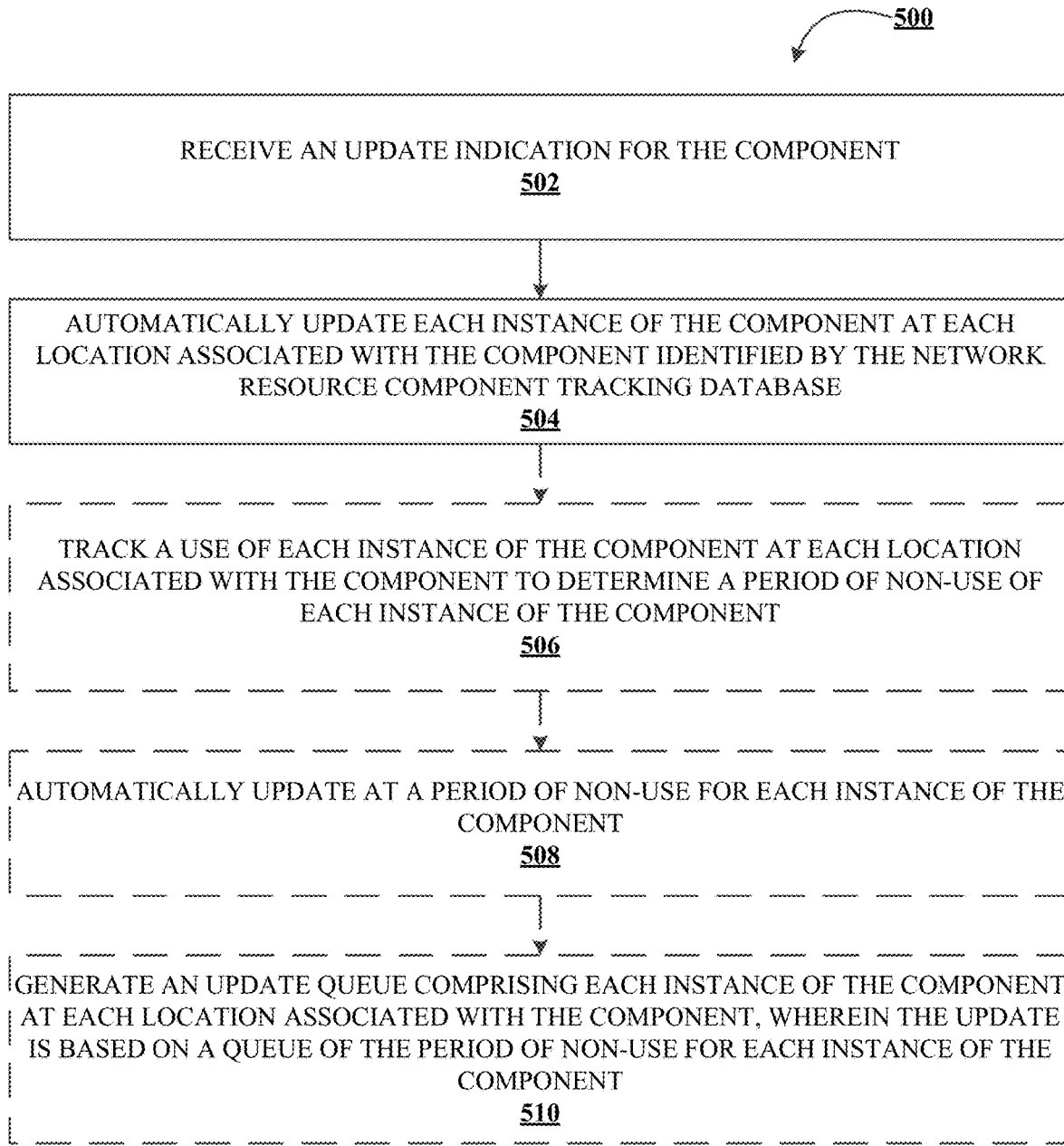

Having thus described embodiments of the invention in general terms, reference will now be made the accompanying drawings, wherein:

FIGS. 1A-1C illustrates technical components of an exemplary distributed computing environment for identifying and verifying software component storage locations in a network environment, in accordance with an embodiment of the invention;

FIG. 2 illustrates a process flow for identifying and verifying software component storage locations in a network environment, in accordance with an embodiment of the invention;

FIG. 3 illustrates a process for updating the network resource component tracking database within the network environment, in accordance with an embodiment of the invention;

FIG. 4 illustrates a process for dynamically updating the network resource component tracking database based on the plurality of location requests, in accordance with an embodiment of the invention; and FIG. 5 illustrates a process for automatically updating each instance of the component at each location associated with the component identified by the network resource component tracking database, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" or "client" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "component" may refer to as a plurality of data elements of a network resource component, where the network resource component refers to a software package or hardware package. For instance, each component may comprise a single data element used to generate the software package, and/or a plurality of data elements used to generate the software package.

As used herein, a "network resource component tracking database" may refer to an index and/or database indicating each component within a network environment and its plurality of locations, such as where the component and its copies may be found in the network environment. For instance, if a plurality of software packages and/or hardware devices/packages in the network environment each use a version and/or exact copy of the component, the network resource component tracking database may indicate each exact location of the software and/or hardware device/package, and the associated version of the component.

As described in further detail herein, the present invention provides a solution to the above-referenced problems in the field of technology by accurately and efficiently generating a network resource component tracking database which tracks, verifies, and in some embodiments updates, components within a network environment. The present invention solves the technical problems described herein by generating a plurality of location requests to be transmitted to a plurality of locations that are associated with each component and the component's instances (individual copies of the component) and receiving a plurality of location responses that may either confirm or deny whether the component's instances are still at the location and/or in use at the location. Further, and based on each of the received location responses, the identification and verification system may update (e.g., dynamically update) the network resource component tracking database to show, in real-time, where each component is within the network environment. Additionally, and/or alternatively, the identification and verification system may go further by using the updated network resource component tracking database to identify which instances of the component to update, the updating instance's specific locations, and/or what time period to update the specific instances as not to interfere with each instance's use. The solution described herein intends to at least solve the technical problem of identifying, verifying, and in-real time tracking individual components in a network environment without the undue burden on processors having to individually track each component and scan entire network environments each time a component must be identified.

Accordingly, the identification and verification system works by generating a network resource component tracking database associated with a network environment, the network resource component tracking database comprising a plurality of location indicators associated with the component; generating a plurality of location requests based on the plurality of location indicators; transmitting the plurality of location requests to a plurality of locations associated with the plurality of location indicators; receiving a plurality of location responses based on the plurality of location requests; and updating the network resource component tracking database based on the plurality of location responses.

What is more, the present invention provides a technical solution to a technical problem. As described herein, the technical problem includes the failure of prior systems to accurately and efficiently track individual components and individual instances of components within a network environment, where such tracking within previous systems even further failed to include a verification that each component is still at the previously-identified location from a previous scanning of the network environment. The technical solution presented herein allows for an identification and verification system to accurately and efficiently identify and update a network resource component tracking database with real-time data for each component within a network environment, while providing for optimal processing device use and efficient tracking. In particular, identification and verification system is an improvement over existing solutions to the identification and tracking of the components in the network environment, (i) with fewer steps to achieve the solution, thus reducing the amount of computing resources, such as processing resources, storage resources, network resources, and/or the like, that are being used (e.g., allowing a processor to transmit requests and receive responses from the locations themselves, rather than individual scanning each location for the components); (ii) providing a more accurate solution to problem, thus reducing the number of resources required to remedy any errors made due to a less accurate solution; (iii) removing manual input and waste from the implementation of the solution, thus improving speed and efficiency of the process and conserving computing resources; (iv) determining an optimal amount of resources that need to be used to implement the solution (e.g., such as processing device resources), thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for identifying and verifying software component storage locations in a network environment 100, in accordance with an embodiment of the invention. As shown in FIG. 1A, the distributed computing environment 100 contemplated herein may include a system 130 (i.e., an identification and verification system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file servers, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for identifying and verifying software component storage locations in a network environment and updating a network resource component tracking database, in accordance with an embodiment of the invention. In some embodiments, a system (e.g., similar to one or more of the systems described herein with respect to FIGS. 1A-1C) may perform one or more of the steps of process flow 200. For example, a identification and verification system (e.g., the system 130 described herein with respect to FIGS. 1A-1C) may perform the steps of process flow 200.

As shown in block 202, the process flow 200 may include the step of generating a network resource component tracking database associated with a network environment, the network resource component tracking database comprising a plurality of location indicators associated with a component. By way of non-limiting example, the identification and verification system may generate the network resource component tracking database by first generating a plurality of location indicators associated with components within the network environment. For instance, the identification and verification system may scan the network environment for each location of the component which have already been propagated in the network environment in order to determine each location of the instance of the component (e.g., each copy of the component). For instance, the identification and verification system may scan (e.g., analyze) each location within the network environment and generate a record of each instance of the component within each location and any associated hardware devices/software files.

Further, and in some embodiments, each copy of a component within the network environment may be recorded as an instance of the component within the network environment and each instance may comprise the exact same data (e.g., version data, software data, script data, and/or the like). In some embodiments, the identification and verification system may keep versions of the component separate by indicating different instances for each component version (e.g., a first instance identifier may be used to identify a plurality of instances that comprise the same version, and a second instance identifier may be used to identify a plurality of instances that comprise a different version than the first instance identifier).

In some embodiments and by way of non-limiting example, the identification and verification system may use each of the instances and their associated locations within the network environment to generate location indicators associated with the component for the instance(s). Such location indicators may comprise unique data elements describing where exactly in the network environment the plurality of instances may be located, such that each instance has its own unique location indicator associated with the instance. For instance, each location indicator may comprise a data element showing what exact software package each instance of the component may be found, in what server each software package can be found, in what device/hardware the software package can be found, and/or what relationships with other software packages and/or hardware there may be, and/or the like.

In some embodiments, the scanning of the network environment may comprise a physical scanning of the network environment, such as by software scanning each software package and/or hardware device within the network environment to determine what each software package and/or hardware device comprises or executes of the components. In some embodiments, the identification and verification system may scan a previous index and/or previous version of the network resource component tracking database to determine where instances of the component(s) are located based on previous iterations of the process described herein.

In some embodiments, the identification and verification system may identify each version of the component and each instance of the component's associated version. For instance, each component may comprise a potential version that each instance may comprise within network environment, where in some embodiments each instance may comprise a version identifier identifying which of the potential versions the instance comprises. In this manner, the identification and verification system may determine which version of each instance of the component is at each location, where one version of the component may be propagated and/or used in multiple locations in the network environment (e.g., may be used in multiple instances). In some embodiments, the identification and verification system may identify only a specific version of the component to track and identify within the network environment, such that only that version of the component and its iterations (e.g., instances) throughout the identification and verification system are updated and/or their locations are updated within the network resource component tracking database.

In some embodiments, the generation of the network resource component tracking database may comprise the generation of the plurality of location indicators associated with the component by scanning a new iteration of the component (i.e., new instance that was not previously used and/or stored in the network environment and/or a new instance that matches copied instances that were previously used in the network environment, which may likewise include the same version type) which has been uploaded to the network environment. The identification and verification system may, at the same time it is scanning the new iteration(s) of the component(s), determine each new location of the new iteration of the component and its intended location to be transmitted and/or propagated to. For instance, the identification and verification system may determine, after the new iteration has been uploaded to the network environment, a location indicator may be identified which the new iteration will be propagated and/or uploaded to, such as an address within the network environment, a specific hardware device, a specific software file, and/or the like. The identification and verification system may track this data and update the network resource component tracking database accordingly to show where all new iterations are being propagated to. The identification and verification system may thus track each instance of the component (both old and new) and each location the component is implemented into.

As shown in block 204, the process flow 200 may include the step of generating a plurality of location requests based on the plurality of location indicators. By way of non-limiting example, the identification and verification system may generate the plurality of location requests based on each instance within the current index and/or network resource component tracking database which may show where each instance of the component is located and/or what version each instance of the component comprises. Based on each of these locations within the current index and/or network resource component tracking database, the identification and verification system may generate a plurality of location requests, where a location request may be transmitted to each location associated with the plurality of instances of the component. Such a location request may comprise an identification of the instance of the component, the version of the instance, and/or other such information that must be known by the location to identify the instance.

In some embodiments, once the location request has been generated, the location request may be transmitted to each location based on the identified location indicator. For instance, the location indicator may act to identify the specific locations of where each instance is stored and/or executed within the network environment. Each location indicator, may thus, be a unique data element and/or unique series of data elements to identify each location throughout the network environment.

As shown in block 206, the process flow 200 may include the step of transmitting the plurality of location requests to a plurality of locations associated with the plurality of location indicators. By way of non-limiting example, the identification and verification system may transmit each of the location requests to each location associated with each instance of the component. Subsequently, and in some embodiments, each location within the network environment that receives the location request, may analyze their data (e.g., scan) to determine whether the instance of the component is still stored in the location and/or whether the instance of the component is still being executed. For example, such locations may comprise at least one of a software file, an engine, a server, a hardware device, and/or the like.

In some embodiments, these location requests may be transmitted to each location at the same time (i.e., exact same time); may be sent at a similar time (e.g., within a millisecond of each other, within a few milliseconds of each other, within a second of each other, within a few seconds of each other, within a minute of each other); may be sent at pre-determined intervals that may be set by the identification and verification system, by a manager of the system, and/or by a client of the identification and verification system. In some embodiments, the plurality of location requests may be sent only to specific locations which are specified based on the location indicators and/or based on a specific aspect of the component within each location (e.g., only those components having a specified version, and/or the like).

In some embodiments, the location requests may comprise data regarding the component (e.g., an instance of the component) for each location, such as data regarding the assumed version of the component (e.g., based on the current network resource component tracking database and its previous update to locations of each component), data regarding the last update to the component, data regarding the component's source (e.g., if the component came from a specific software package and whether the software package is the same as it is currently for the component), and/or the like.

As shown in block 208, the process flow 200 may include the step of receiving a plurality of location responses based on the plurality of location requests. By way of non-limiting example, the identification and verification system may receive a plurality of location responses from each location that received the plurality of location requests which may confirm or deny whether the instance of the component is still at the location. In some embodiments, the confirmation may be in the form of a binary computer-readable code, such as a 0 or 1 (e.g., a 0 may indicate that the component is no longer in use and/or is no longer at the location; and a 1 may indicate that the component is in use and/or is at the location). In some embodiments, the location response may further comprise an indication of the version of the component and whether or not the current version of the component matches the data in the location request, an indication of whether the component was last updated and at what date/time and whether this indication matches the data in the location request, an indication regarding the component's assumed source and whether the component at the location comprises this matching data, and/or the like.

In some embodiments, such a transmission of the plurality of location requests and plurality of location responses may be transmitted within the identification and verification system's network, such that the transmissions do not ever leave system 130. In some embodiments, and for those locations associated with the location indicators that are housed outside the identification and verification system, the location requests and the location responses may be transmitted over a network, such as network 110 of FIG. 1.

As shown in block 210, the process flow 200 may include the step of updating the network resource component tracking database based on the plurality of location responses. By way of non-limiting example, the identification and verification system may update the network resource component tracking database based on whether the data within the location response match the data in the location request for each location.

In some embodiments, and where the data for an instance has not changed, the identification and verification system may not need to update the specific data regarding each instance of the component and may instead timestamp its last confirmation of each set of data for each instance of the component associated with each location. In this manner, the identification and verification system may determine that it does not have to run another iteration of the process described herein on the component for a specified amount of time and/or until some event occurs, such as a shutdown event within the network environment that cause a black out period, a network environment-wide update, and/or the like.

FIG. 3 illustrates a process flow for updating the network resource component tracking database within the network environment, in accordance with an embodiment of the invention. In some embodiments, a system (e.g., similar to one or more of the systems described herein with respect to FIGS. 1A-1C) may perform one or more of the steps of process flow 300. For example, an identification and verification system (e.g., the system 130 described herein with respect to FIGS. 1A-1C) may perform the steps of process flow 300.

By way of non-limiting example, the embedding of each instance of the component may be done by determining a specified function for a computing system, such as a device, where the software and its components are generated and implemented within the computing system to perform the specified function. In some embodiments, such a computing system may only perform the specified function and each of the components within the computing system are "embedded" and/or created and implemented for this specified function, only.

In some embodiments, and at least after block 202 and as shown in block 302, the process flow 300 may include the step of tracking the embedding of each instance of the component within the network environment, the embedding of each instance of the component comprising a plurality of hardware components having an instance of the component embedded thereon. By way of non-limiting example, such locations of the embedded instances of the component(s) may be embedded in a plurality of computing devices and/or computing systems, such as hardware devices used in a computing system (e.g., a processor, a memory such as a random access memory (RAM) or hard drive, power supply, central processing unit (CPU), hard disk, solid state drive, motherboard, flash drive plugged into a computing system on a network environment, external hard drive, and/or the like).

In some embodiments, the identification and verification system may track each instance of the component that is embedded at each location (e.g., at each computing system within the network environment), and determine whether each instance of the component is still embedded at each location, whether each instance of the component is still in use at each location, what each instance of the component comprises a specified version, and/or the like. In this manner, the identification and verification system may track embedded software components where in previous technological improvements, such a tracking of embedded software would have been difficult in light of its isolation within the computing system from the rest of the instances of the component(s) in the network environment. For instance, the identification and verification system may track each instance of the component at each hardware component listed as a location associated with the instance(s) of the component(s).

In some embodiments, and at least after block 302 and as shown in block 304, the process flow 300 may include the step of updating the network resource component tracking database with a plurality of hardware component identifiers associated with the plurality of hardware components having the instance of the component.

In some embodiments, the identification and verification system may update—in a similar manner to that described above with respect to FIG. 2—the network resource component tracking database by generating a plurality of location requests for each instance of the component that has been embedded in a computing system, transmitting the plurality of location requests to the plurality of locations associated with the embedded instances of the component(s), and receiving a plurality of location responses from each location associated with the embedded instances of the component(s).

In some embodiments, and at least after block 202 and as shown in block 306, the process flow 300 may include the step of tracking the embedding of each instance of the component within the network environment, the embedding of each instance of the component comprising a plurality of software files comprising an instance of the component embedded therein. By way of non-limiting example, such locations of the embedded instances of the component(s) may be embedded in a plurality of computing files (i.e., software files) within a computing system, such that the embedded instances of the components may be extracted to the hardware components of the computing system (e.g., RAM, processing device/processor, CPU, and/or the like) for execution. In some embodiments, the embedded instances of the component(s) may be stored in computing files until there is such a need as to execute and/or run the component(s) within the computing system.

In some embodiments, and at least after block 306 and as shown in block 308, the process flow 300 may include the step of updating the network resource component tracking database with a plurality of file identifiers associated with the plurality of software files comprising the instance of the component. By way of non-limiting example, the identification and verification system may update the network resource component tracking database, after tracking the instance(s) of the component(s) within each software file found within the network environment and—in real-time—determining whether each instance of the component is still located and/or in use where it was previously listed (e.g., by previous instance of the network resource component tracking database and/or by an scanning of the network environment).

In some embodiments, the identification and verification system may update—in a similar manner to that described above with respect to FIG. 2 and block 304 of FIG. 3—the network resource component tracking database by generating a plurality of location requests for each instance of the component that has been embedded in a computing system (e.g., embedded in a software file), transmitting the plurality of location requests to the plurality of locations associated with the embedded instances of the component(s), and receiving a plurality of location responses from each location associated with the embedded instances of the component(s).

In some embodiments, and where an instance of the component is not located where it was previously indicated as located within the network resource component tracking database, the identification and verification system may transmit a plurality of location requests to the surrounding locations associated with the instant location (e.g., the location that previously received the location request) and request confirmation from each of the surrounding locations of whether and/or where the instance of the component may be located. By way of non-limiting example, the identification and verification system may use this data to determine an entirely new location of the instance of the component. By way of non-limiting example, such surrounding locations may comprise a plurality of storage components and/or processing components that can store and/or execute the instance(s) of the component(s) which may have a relationship with the previous instant location (e.g., the location that previously received the location request). For instance, such a relationship between locations may be determined based on the plurality of locations, the locations' individual functions, and the functions of each location as they interact with other locations (e.g., a software file may store a component at one period of time, and a connected processor may upload and execute the component, where both locations may be connected to show a specific relationship for the component). In some embodiments, these relationships may be shown in the network resource component tracking database as a mapping of the locations, the instances of the component(s) at each location, and the relationships between each location (e.g., which may be shown as nodes between each location).

FIG. 4 illustrates a process flow for dynamically updating the network resource component tracking database based on the plurality of location requests, in accordance with an embodiment of the invention. In some embodiments, a system (e.g., similar to one or more of the systems described herein with respect to FIGS. 1A-1C) may perform one or more of the steps of process flow 400. For example, an identification and verification system (e.g., the system 130 described herein with respect to FIGS. 1A-1C) may perform the steps of process flow 400.

As shown in block 402, the process flow 400 may include the step of dynamically updating the network resource component tracking database based on the plurality of location requests. By way of non-limiting example, the identification and verification system may dynamically update, or continuously update, the network resource component tracking database based on continuously receiving a plurality of location responses associated with instance(s) of component(s). For instance, the identification and verification system may be designed to generate and transmit a plurality of location requests to a plurality of locations (e.g., which are associated with a plurality of instances of a plurality of components) such that the identification and verification system is continuously updating each of the instances and their associated locations. In this manner, the identification and verification system may be continuously and dynamically updated instead of only updating when a component is requested to be found and/or updated. Such an identification and verification system may then keep up-to-date records of each component and its plurality of instances.

In some embodiments, block 402 which shows a dynamic update of the network resource component tracking database based on plurality of location responses received, may likewise be shown as block 210 of FIG. 2.

In some embodiments, and at least after block 402 and as shown in block 404, the process flow 400 may include the step of deleting, in an instance where a location response comprises an indication that the component is not in a location associated with the location indicator associated with the component in the network resource component tracking database. By way of non-limiting example, and where the location response(s) indicate that the component (e.g., the instance of the component that was at least previously associated with the location) is not in the location anymore and/or is not in use at the location (e.g., the instance of the component is stored, but has not been executed in a long period of time, such as since the last dynamic update of the network resource component tracking database). In some embodiments, once the identification and verification system determines that the instance(s) of the component is no longer located and/or in use at the location associated with the location response, the identification and verification system may completely delete (i.e., erase all previous data stored for the instance of the component showing the location being associated with the instance) the location indicator associated with the component in the network resource component tracking database.

In some embodiments, the identification and verification system may not delete the location indicator associated with the component in the network resource component tracking database, but instead may place a dormant indicator (i.e., which may identify the location associated with the instance of the component as comprising a dormant instance of the component) to show that the instance of the component is not in use. In this manner, the identification and verification system may keep a complete record of the instance(s) of the component(s) within the network resource component tracking database, including all instances of the components and their locations from the start of the network resource component tracking database.

In some embodiments, and at least after block 402 and as shown in block 406, the process flow 400 may include the step of saving, in an instance where a location response comprises an indication that the component is in the location associated with the location indicator, the location indicator associated with the component in the network resource component tracking database. By way of non-limiting example, and where the location response(s) indicate that the component (e.g., the instance of the component that was at least previously associated with the location) is in the location, the identification and verification system may save the location indicator (e.g., re-save the location indicator which matches the previous location indicator associated with the instance of the component) to the network resource component tracking database as being associated with the instance of the component. For instance, and in some embodiments, the identification and verification system may re-save the location indicator to the network resource component tracking database and overwrite all previous location indicator(s) saved with the instance of the component.

In some embodiments, the identification and verification system may save the location indicator to the network resource component tracking database as an updated location indicator for the instance of the component, such that all previous location indicators are kept and/or saved to the network resource component tracking database. In this manner, the network resource component tracking database may keep a complete record of the location(s) of the instance(s) within the network resource component tracking database, including all instances and their locations from the start of the network resource component tracking database, as well as the location indicators and their time-stamps of when the location indicators were saved and/or confirmed by the identification and verification system.

FIG. 5 illustrates a process flow for automatically updating each instance of the component at each location associated with the component identified by the network resource component tracking database, in accordance with an embodiment of the invention. In some embodiments, a system (e.g., similar to one or more of the systems described herein with respect to FIGS. 1A-1C) may perform one or more of the steps of process flow 500. For example, an identification and verification system (e.g., the system 130 described herein with respect to FIGS. 1A-1C) may perform the steps of process flow 500.

As shown in block 502, the process flow 500 may include the step of receiving an update indication for the component. By way of non-limiting example, the identification and verification system may be tasked with identifying what instance(s) of the component(s) should be updated (e.g., updated by a new version) and at what times. The identification and verification system may, in some embodiments, have this update process start by first receiving an update indication for the component, which may identify a specific component within the network environment to update. The identification and verification system may, in some embodiments, then identify the plurality of instances associated with the component (e.g., the plurality of instances that the component has in the network environment) and the plurality of locations associated with the plurality of instances of the component. For instance, the process of identifying the plurality of instances and the associated locations is further described above with respect to FIGS. 2, 3, and 4.

By way of non-limiting example, the identification and verification system may receive the update indication for the component from a user device associated with a user of the identification and verification system, such as a client of the system (e.g., an entity which uses the system to track its components within its own network environment) and/or a manager of the identification and verification system.

As shown in block 504, the process flow 500 may include the step of automatically updating each instance of the component at each location associated with the component identified by the network resource component tracking database. By way of non-limiting example, the identification and verification system may automatically update each instance of the component throughout the network environment, even where each instance of the component is located in different locations. In some embodiments, such a network environment-wide update may comprise the updating of each instance of the component at the same time (i.e., same exact time) and/or similar time (e.g., within a few milliseconds of each other, within a second of each other, within a few seconds of each other, within a minute of each other, within a few minutes of each other, within an hour of each other, within a few hours of each other, and/or the like).

In some embodiments and as shown in block 506, the process flow 500 may include the step of tracking a use of each instance of the component at each location associated with the component to determine a period of non-use of each instance of the component. By way of non-limiting example, the identification and verification system may track each instance of the component and each instance's use (e.g., when the instance of the component is run and/or executed within the network environment) as well as at what point in time each instance is used. The identification and verification system may keep track within the network resource component tracking database of each instance associated with the component and each instance's times of use, such as by storing time stamps (e.g., time of day, specific dates, specific days of the week, and/or the like) where each instance is used and for how long (e.g., a period of use). In this manner, the identification and verification system may also track when each instance associated with the component is not used and for how long (e.g., a period of non-use), and the identification and verification system may automatically update only those instances of the components which are currently tracked as not being in use (e.g., the instance of the component is in its period of non-use, based on previous tracking of the instance).

In some embodiments and as shown in block 508, the process flow 500 may include the step of automatically updating at a period of non-use for each instance of the component. By way of non-limiting example, the identification and verification system may do such a tracking of use and a tracking of non-use in order to determine optimized times for each individual instance of the component to run and/or execute an update, such that each instance is not updated while it is being executed and potentially running the chance of the update interfering with the component's useability in the network environment. Such an improvement over existing technology allows the system to stagger the updates to each instance of the component and keep processing power down (i.e., only run the processing device for updating when it will not interrupt the use of the instances) while ensuring that the automatic network-wide updates still occur.

In some embodiments and as shown in block 510, the process flow 500 may include the step of generating an update queue comprising each instance of the component at each location associated with the component, wherein the update is based on a queue of the period of non-use for each instance of the component. By way of non-limiting example, the identification and verification system may generate an update queue, which may comprise a queue of instances of the component that should be updated in a specified order. For instance, the update queue may include all the instances of the component within the network environment, their individual locations, and/or a series of instances and their associated times for updating (e.g., which would correspond to the period of non-use for each instance).

In some embodiments, the update queue may comprise only certain instances of the component, where the certain instances may be only those instances that have a period of use at the time the automatic update indication for the component was received by the system. In this manner, the identification and verification system may update all of the instances of the component that are available for an update (i.e., were in a period of non-use according to the system), automatically and immediately when the update indication was received. The identification and verification system may also generate the update queue to comprise those instances of the component that were in a period of use at the time the update indication was received, such that the instances in their period of use are queued for a future update.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 13625US01. 014033. 4406 | 17/887,152 | ELECTRONIC SYSTEM FOR IMPLEMENTING INTERCONNECTIONS AND AUTHENTICATING PERMISSIONS BETWEEN RESOURCE COMPONENTS | Concurrently herewith |
| 13626US01. 014033. 4407 | 17/887,073 | ELECTRONIC SYSTEM FOR AUTHENTICATING PERMISSIONS BETWEEN INTERCONNECTED RESOURCES | Concurrently herewith |
| 13627US01. 014033. 4408 | 17/887,089 | ELECTRONIC ARTIFICIAL INTELLIGENCE SYSTEM FOR AUTHENTICATING SOFTWARE | Concurrently herewith |
| 1344US01. 014033. 4354 | 17/886,822 | ELECTRONIC SECURITY SYSTEM OF NETWORK RESOURCE COMPONENT TRACKING AND ANALYSIS ACROSS A DISTRIBUTED NETWORK AND CONSTRUCTION OF A VALIDATED NETWORK RESOURCE COMPONENT LIBRARY | Concurrently herewith |
| 13676US01. 010433. 4421 | 17/886,832 | ELECTRONIC SYSTEM FOR DYNAMIC ADAPTED SECURITY ANALYSIS OF NETWORK RESOURCE COMPONENTS | Concurrently herewith |
| 13677US01. 014033. 4422 | 17/886,846 | DYNAMIC QUARANTINE ENGINE INTEGRATION WITH A VALIDATED NETWORK RESOURCE COMPONENT LIBRARY FOR NETWORK SECURITY | Concurrently herewith |
| 13678US1. 014033. 4423 | 17/886,862 | ELECTRONIC SYSTEM FOR SECURITY ANALYSIS AND VALIDATION DURING CONSTRUCTION AND DEPLOYMENT OF DYNAMIC NETWORK COMPONENTS | Concurrently herewith |

What is claimed is:

1. A system for identifying and verifying software locations in a network environment, the system comprising:
   a memory device with computer-readable program code stored thereon;
   at least one processing device operatively coupled to the at least one memory device and the at least one communication device, wherein executing the computer-readable code is configured to cause the at least one processing device to:
      generate a network resource component tracking database associated with a network environment, the network resource component tracking database comprising a plurality of location indicators associated with a component;
      generate a plurality of location requests based on the plurality of location indicators;
      transmit the plurality of location requests to a plurality of locations associated with the plurality of location indicators, wherein the plurality of locations each comprises an instance of the component individually stored at each location;
      receive, based on the transmission of the plurality of location requests, a plurality of location responses from the plurality of locations, wherein the plurality of location responses comprises a current use of each instance of the component;
      update the network resource component tracking database based on the plurality of location responses comprising the current use of each instance of the component at a current time, wherein the network resource component tracking database comprises periods of use and non-use for each instance over a plurality of historical tracking periods;
      determine, based on the current use of each instance of the component at the current time and periods of use and non-use over the plurality of historical tracking periods, a period of non-use of each instance of the component at each location;
      generate an update queue comprising each instance of the component, wherein the update queue is based on a queue for the period of non-use for each instance of the component; and
      automatically update, in an instance where an update indication is received for the component, the component at a period of non-use for each instance of the component.

2. The system of claim 1, wherein the generation of the network resource component tracking database comprises the processing device being further configured to generate the plurality of location indicators associated with the component by a current scanning of the network environment for each location of the component.

3. The system of claim 1, wherein the generation of the network resource component tracking database comprises the process device being further configured to generate the plurality of location indicators associated with the component by fully scanning the network environment at an instance where a new iteration of the component is uploaded to the network environment and determining a new location of the new iteration of the component.

4. The system of claim 1, wherein the component comprises a version of the component, such that the plurality of location requests are transmitted to the plurality of locations associated with the version of the component.

5. The system of claim 1, wherein the component comprises a plurality of versions of the component, such that the plurality of location requests are transmitted to the plurality of locations associated with the plurality of versions of the component.

6. The system of claim 1, wherein the processing device is further configured to:
   track the embedding of each instance of the component within the network environment, the embedding of each instance of the component comprising a plurality of hardware components having an instance of the component embedded thereon; and
   update the network resource component tracking database with a plurality of hardware component identifiers associated with the plurality of hardware components having the instance of the component.

7. The system of claim 1, wherein the processing device is further configured to:
   track the embedding of each instance of the component within the network environment, the embedding of each instance of the component comprising a plurality of software files comprising an instance of the component embedded therein; and
   update the network resource component tracking database with a plurality of file indicators associated with the plurality of software files comprising the instance of the component.

8. The system of claim 1, wherein the network resource component tracking database comprises a map of each instance of the component within a plurality of locations, the plurality of locations comprising location indicators and a plurality of nodes between each location indicator.

9. The system of claim 1, wherein the processing device is further configured to:
   dynamically update the network resource component tracking database based on the plurality of location responses,
      wherein, in an instance where a location response comprises an indication that the component is not in a location associated with a location indicator of the plurality of location indicators, delete the location indictor associated with the component in the network resource component tracking database, or
      wherein, in an instance where a location response comprises an indication that the component is in the location associated with the location indicator, save the location indicator associated with the component in the network resource component tracking database.

10. The system of claim 1, wherein the processing device is further configured to:
    receive an update indication for the component; and
    automatically update each instance of the component at each location associated with the component identified by the network resource component tracking database.

11. The system of claim 1, wherein the update queue comprises a specified order of instances for updating each instance of the component stored at each location, and wherein the update queue comprises each instance of the component, each location for each instance of the component, and an associated time for updating each instance.

12. A computer program product for identifying and verifying software locations in a network environment, wherein the computer program product comprises at least one non-transitory computer-readable medium having computer-readable program code portions embodied therein, the computer-readable program code portions which when executed by a processing device are configured to cause the processor to:

generate a network resource component tracking database associated with a network environment, the network resource component tracking database comprising a plurality of location indicators associated with a component;

generate a plurality of location requests based on the plurality of location indicators;

transmit the plurality of location requests to a plurality of locations associated with the plurality of location indicators, wherein the plurality of locations each comprises an instance of the component individually stored at each location;

receive, based on the transmission of the plurality of location requests, a plurality of location responses from the plurality of locations, wherein the plurality of location responses comprises a current use of each instance of the component;

update the network resource component tracking database based on the plurality of location responses comprising the current use of each instance of the component at a current time, wherein the network resource component tracking database comprises periods of use and non-use for each instance over a plurality of historical tracking periods;

determine, based on the current use of each instance of the component at the current time and periods of use and non-use over the plurality of historical tracking periods, a period of non-use of each instance the component at each location;

generate an update queue comprising each instance of the component, wherein the update queue is based on a queue for the period of non-use for each instance of the component; and automatically update, in an instance where an update indication is received for the component, the component at a period of non-use for each instance of the component.

13. The computer program product of claim 12, wherein the generation of the network resource component tracking database comprises the processing device being further configured to generate the plurality of location indicators associated with the component by a current scanning of the network environment for each location of the component.

14. The computer program product of claim 12, wherein the generation of the network resource component tracking database comprises the process device being further configured to generate the plurality of location indicators associated with the component by fully scanning the network environment in an instance where a new iteration of the component is uploaded to the network environment and determining a new location of the new iteration of the component.

15. The computer program product of claim 12, wherein the processing device is further configured to:
track the embedding of each instance of the component within the network environment, the embedding of each instance of the component comprising a plurality of hardware components having an instance of the component embedded thereon; and
update the network resource component tracking database with a plurality of hardware component identifiers associated with the plurality of hardware components having the instance of the component.

16. The computer program product of claim 12, wherein the processing device is further configured to:
track the embedding of each instance of the component within the network environment, the embedding of each instance of the component comprising a plurality of software files comprising an instance of the component embedded therein; and
update the network resource component tracking database with a plurality of file indicators associated with the plurality of software files comprising the instance of the component.

17. The computer program product of claim 12, wherein the processing device is further configured to:
dynamically update the network resource component tracking database based on the plurality of location responses,
wherein, in an instance where a location response comprises an indication that the component is not in a location associated with a location indicator of the plurality of location indicators, delete the location indictor associated with the component in the network resource component tracking database, or
wherein, in an instance where a location response comprises an indication that the component is in the location associated with the location indicator, save the location indicator associated with the component in the network resource component tracking database.

18. The computer program product of claim 12, wherein the processing device is further configured to:
receive an update indication for the component; and
automatically update each instance of the component at each location associated with the component identified by the network resource component tracking database.

19. A computer-implemented method for identifying and verifying software locations in a network environment, the computer-implemented method comprising:
generating a network resource component tracking database associated with a network environment, the network resource component tracking database comprising a plurality of location indicators associated with a component;
generating a plurality of location requests based on the plurality of location indicators;
transmitting the plurality of location requests to a plurality of locations associated with the plurality of location indicators, wherein the plurality of locations each comprises an instance of the component individually stored at each location;
receiving, based on the transmission of the plurality of location requests, a plurality of location responses from the plurality of locations, wherein the plurality of location responses comprises a current use of each instance of the component;
updating the network resource component tracking database based on the plurality of location responses comprising the current use of each instance of the component at a current time, wherein the network resource component tracking database comprises periods of use and non-use for each instance over a plurality of historical tracking periods;
determining, based on the current use of each instance of the component at the current time and periods of use and non-use over the plurality of historical tracking periods, a period of non-use of each instance the component at each location;
generating an update queue comprising each instance of the component, wherein the update queue is based on a queue for the period of non-use for each instance of the component; and automatically updating, in an instance where an update indication is received for the component, the component at a period of non-use for each instance of the component.

* * * * *